United States Patent Office

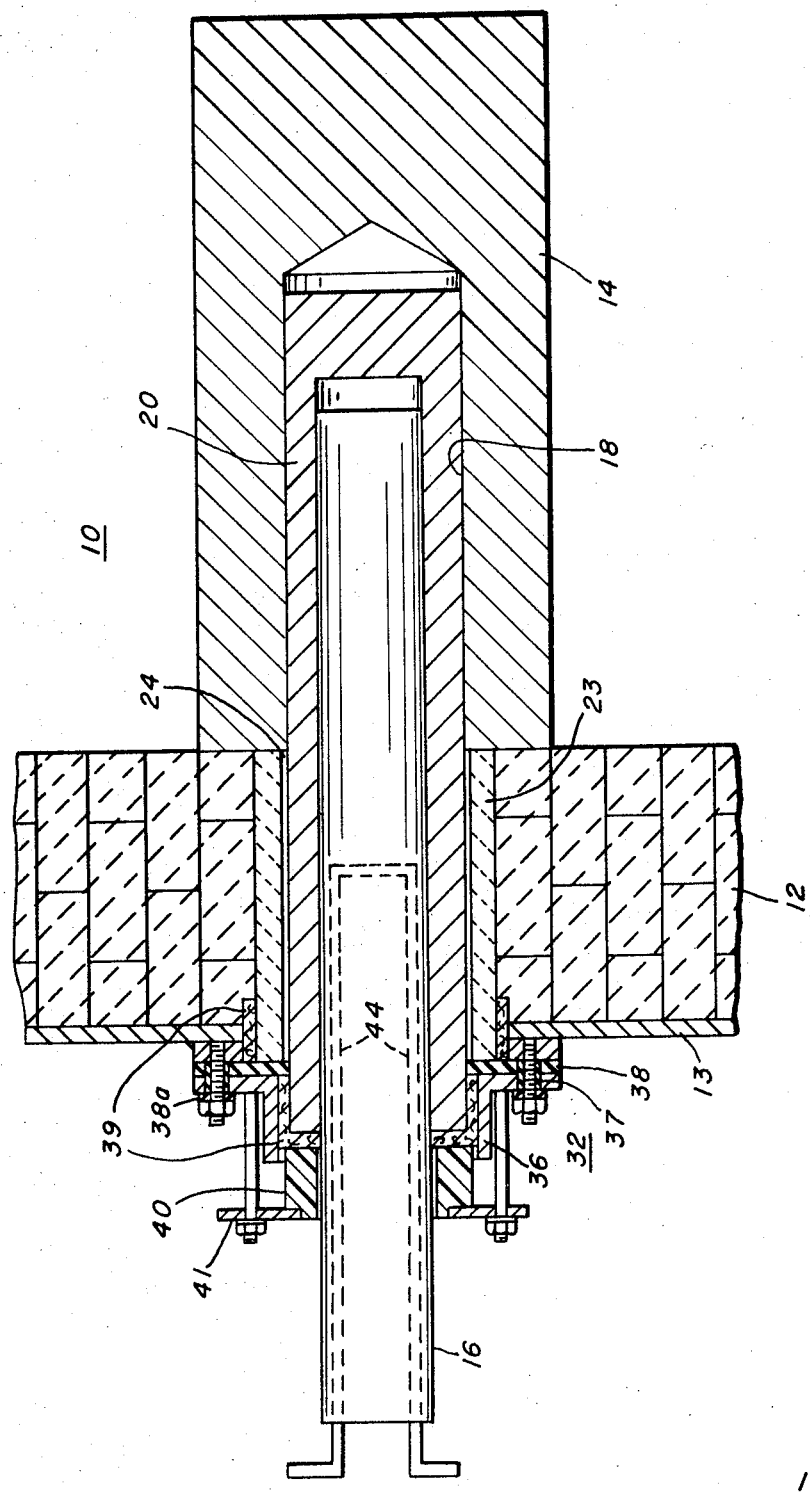

3,745,107
Patented July 10, 1973

3,745,107
PROTECTED ELECTRODE LEAD FOR USE IN A CORROSIVE ENVIRONMENT
Stanley C. Jacobs, Lower Burrell, Pa., assignor to Aluminum Company of America, Pittsburgh, Pa.
Filed Sept. 7, 1971, Ser. No. 178,283
Int. Cl. C22d 3/02; B01k 3/04
U.S. Cl. 204—243 R  7 Claims

ABSTRACT OF THE DISCLOSURE

An electrode assembly for use in an electrolytic cell having a corrosive environment comprising high temperature chlorine gas and a bath of aluminum chloride dissolved in one or more salts. The assembly comprises an electrode disposed within the cell, at least one electrical current conducting lead made of material susceptible to corrosive attack by the environment extending into the electrode, and a fluid impervious, electrically conductive sleeve disposed around the lead along at least the length thereof extending through a wall of the cell, and in contact with the electrode. The fluid impervious sleeve is effective to prevent contact of approaching corrosive constituents with the lead.

BACKGROUND OF THE INVENTION

The present invention relates generally to an electrode assembly for use in corrosive atmospheres and particularly to an electrode structure for electrolytic cells employed in the production of aluminum from aluminum chloride dissolved in a molten salt bath of one or more alkali metal halides having a higher decomposition potential than aluminum chloride.

The potential advantages of utilizing aluminum chloride as a source material in the electrolytic reduction of aluminum have long been recognized but the commercial realization thereof has been impeded by an inability to solve the many problems attending the same. Among the more serious problems of long standing has been the problem of applying and removing current from electrodes, located within electrolysis cells and furnaces employed in the reduction process, with leads and conductors that can withstand attack by the constituents of the corrosive environment, i.e., the aluminum chloride containing bath and chlorine gas. The electrodes in such a cell extend into the electrolytic bath, and thus are in contact therewith, for the transmission of current through the bath. The electrode leads are employed to electrically connect the electrodes to conductors and circuits located externally of the cells.

The leads connected to the cell electrodes can readily be made of electrically conductive metal, such as copper, but such metal leads are subject to corrosive attack by the bath and chlorine gas at the operating temperature of the cell which results in the rapid destruction thereof. Since the melting point of aluminum is approximately 660 degrees centigrade, electrolytic cells employed in producing aluminum from chloride are usually operated at about 700 degrees centigrade. No known metal can withstand the corrosive attack of chlorine over approximately 550 degrees and last longer than a day or two to a few weeks depending upon the metal used and the temperatures involved.

Leads can be made of conductive non-metals, such as graphite, but when sized to carry the necessary current at a low voltage drop are impractically large and conduct excessive amounts of heat from the cell. When such leads are reduced in size to lower heat loss and are made a practical size, they are not sufficiently conductive, i.e., their inherent electrical resistance produces unduly large voltage drops along the length thereof.

Thus, a solution to the problem of supplying and removing current respectively from the anodes and cathodes of electrolytic cells having a corrosive environment would be the use of conductive members extending into the electrodes that are made from a highly conductive, low voltage drop material subject to attack by the corrosive environment, such as a high conductivity metal, but protected from the corrosive environment in an effective manner.

BRIEF SUMMARY OF THE INVENTION

The present invention provides such a solution by the use of a dense, fluid impervious graphite sleeve located around a current conducting lead extending into the electrode. The sleeve preferably extends into the body of the electrode in encircling relation with the lead to completely enclose the lead therewith and within the electrolytic cell. In this manner, any of the bath constituents or chlorine gas, tending to penetrate through the electrode or to the metal lead extending through a wall of the cell will be stopped from reaching the conductive lead by the interposed impervious sleeve.

The electrode assembly and structure as briefly described above, while not in itself rendering the electrolytic production of aluminum from aluminum chloride a commercially viable reality, provides the solution of a fundamental problem of long standing, which problem has effectively impeded progress in this field. As such, the present invention represents a marked contribution to the desired attaining of the ultimate objective of providing an economically feasible and commercial method for reducing aluminum from aluminum chloride.

THE DRAWING

The invention, along with its advantages and objectives, will best be understood from consideration of the following detailed description in connection with the accompanying drawing in which the sole figure is a longitudinal sectional view (with portions shown in elevation) of an electrode assembly constructed in accordance with the principles of the persent invention.

PREFERRED EMBODIMENT OF THE INVENTION

Referring now to the drawing, there is illustrated an electrode assembly 10 of the invention mounted in traverse of a refractory, heat insulating wall 12 (only partially shown) and which may be a top or side wall defining a housing of an electrolytic cell (not shown) having an outer metal shell 13. Such walls function to confine a highly corrosive environment, for example, as would be produced in the electrolysis of aluminum chloride dissolved in a fused salt bath, such as one or more alkali metal halides, in the production of metallic aluminum. The bath and the chlorine gas generated in the electrolysis process are highly penetrative and highly corrosive to metals, particularly at the temperatures encountered in such cells, as explained above.

The electrode assembly 10 comprises an electrode 14 having at least one metal lead 16, in the form of an elongated bar or rod, or other suitable configuration, extending into an opening or bore 18 provided in the face of the body of the electrode facing the cell wall, and a protective sleeve 20 surrounding the metal lead along at least a portion of its length and extending into the bore 18 to completely enclose the lead with the electrode. The sleeve 20 is made of a material that is electrically conductive and impervious to the fluids (i.e., the gases and liquids) within the cell. A sleeve structure and material particularly suitable for the purposes of the invention is a graphite sleeve coated with pyrolytic graphite. Pyrolytic graphite is a vapor deposited form of carbon produced when a carbonaceous gas is thermally decomposed. Carbon atoms from the gas deposit on a surface (which, in the present case, is the external surface of a graphite sleeve) in the form of layers of carbon atoms oriented parallel to the disposition surface. The layers are characterized by a high degree of crystal orientation and carbon purity which form a substantially, if not completely, impervious coating.

In the present invention, the protective sleeve 20 is preferably provided with a pyrolytic graphite coating (or the sleeve may be entirely pyrolytic) to render it impervious to fluids within an electrolytic cell. Other impervious, electrically conductive materials, however, may be employed for the protective sleeve, for example, a graphite sleeve having its pores filled and baked with coal tar pitch or with other resins or materials which leave a carbonaceous material in the pores of the graphite upon baking.

For electrical contact purposes, the internal cross-sectional dimension of the protective sleeve 20 and the outer cross-sectional dimension of the lead 16 are chosen to provide a relatively tight fit between the two along the length of the lead within the sleeve. In this manner good electrical contact and continuity exists between the lead and sleeve.

Good electrical conductivity between the electrode 14 and the sleeve 20 is provided by a force fit between the two. This is accomplished by choosing dimensions for the sleeve and the opening 18 in the body of the electrode that provide such a fit. Ease of insertion and removal of the sleeve, with such a fit, can be accomplished by providing the outer, cross-sectional dimension of the sleeve with a slight taper lengthwise thereof, the decreasing dimension of the taper being in the direction of the electrode body.

The outer face of the electrode 14, as shown in the drawing, is disposed against the inside surface of the insulating cell wall 12, and the electrode may extend along the wall a substantial distance, in which case a plurality of metal leads 16 may extend into a like plurality of openings 18 provided in the electrode for the purpose of supplying electrical current to the electrode if the electrode is an anode, and removing current therefrom if the electrode is a cathode.

In the drawing, an insulating sleeve 23 is shown located around the portion of the sleeve 20 extending through the wall 12. The material of the sleeve 23 is preferably quartz or silicon oxynitride, though other insulating materials can be used. The inner diameter of the sleeve 23 is sized to removably accommodate the sleeve 20, and since the material of the sleeve 23 is not easily prepared (i.e. machined) to provide a tight fit between the two sleeves, an elongated annular space 24 will exist therebetween as shown in the drawing, such space being somewhat exaggerated for purposes of illustration.

In an electrolytic cell having a corrosive environment of the type described above, the gaseous and liquid constituents thereof in contact with the electrode assembly tend to penetrate the electrode to the conductors feeding and removing current therefrom. In the drawing, without suitable protection for the metal lead 16, such corrosive constituents would tend to seep into the area of the lead through the pores of the electrode 14 and along the interface between the wall 12 and the electrode 14.

In accordance with the invention, the lead 16 is thoroughly protected from such an environment by the impervious sleeve 20. Such a sleeve functions to keep any bath or gas that penetrates the electrode 14, or that penetrates between the electrode and the cell wall 12, from reaching the lead 16 in any substantial amounts and thereby increases considerably the life of the lead. For example, with the use of the sleeve of the invention, penetration of the corrosive constituents is minimized to the extent that the lead 16 should remain in essentially good working condition for extended periods of time, possibly for several years. In this manner, the life of the lead will correspond to or more likely extend considerably beyond the operating periods intermediate the normal shutting down of aluminum producing cells for inspection and repair purposes. Hence, any maintenance that the protected lead of the invention might require can be attended to when its associated cell is ordinarily shut-down for such purposes. The taper of the graphite sleeve, as described earlier, also allows the entire electrode assembly to be removed and replaced before shut down of the cell.

In order to seal the sleeves 20 and 23 in the cell wall 12, and to seal the sleeve 20 around the lead 16, a removable, concentric sealing gland arrangement, generally designated 32 in the drawing is employed, the arrangement simultaneously insulating the electrode sleeve 20 and the lead 16 from the conductive shell 13. More particularly, the seal arrangement 32 comprises a flanged collar 36 located around the sleeve 20 and attached to the shell 13 by a suitable fastening means, such as peripherally spaced bolts, extending through the portion of the collar 36 adjacent the shell and threaded into the shell. The collar is insulated from the shell and bolts by insulating bushings 37 surrounding the bolts in the collar, by an insulating washer 38 located between the collar and shell, and by insulating washers 38A located between the collar and bolt heads. Between the collar 36 and the portion of the sleeve 20 adjacent thereto is disposed an insulating packing material 39, such as asbestos rope, the packing material preferably extending into a space between the cell wall 12, 13 and the insulating sleeve 23 to seal the wall about the sleeve.

Adjacent the end of the collar 36 remote from the shell 13, and disposed about the lead 16, is located an insulating bushing 40 held in place over the packing material 39 confined by the collar 36 by a rigid plate 41 secured to the collar by fastening bolts extending through the plate and into the portion of the collar adjacent the shell. The bushing 40 insulates the inner edge of the plate 41 and the collar 36 from the lead 16 while simultaneously positively securing the packing 39 at the end of the sleeve 20 and around the metal member.

Such a concentric sealing arrangement conveniently serves to seal the cell wall 12 against leakage of the liquids and gases from the cell about the insulating sleeve 23, and to maintain the insulation provided between the conductive cell shell 13 and the sleeve 20 by the sleeve 23.

The portion of the lead 16 extending through the cell wall 13 is further provided with internal passages 44 for conducting a cooling fluid through the lead. Since the material of the lead is highly conductive, the heat within its associated electrolysis cell would be quickly conducted to all portions of the lead including those positions in the area of the seal arrangement 32. A cooling fluid conducted through passages 44 functions to maintain that portion of the lead at a substantially uniform temperature so that expansion and contraction of the lead is minimized, if not effectively avoided, in the area of the seals. In this manner, the sealing function of the seals is not adversely affected by temperature changes within and without the cell.

Cooling the portion of the lead 16 remote from the interior of a cell by means of a circulating coolant serves an additional function in combination with the insulating sleeve 23. In an electrolysis cell, the molten electrolytic bath in contact with the electrode assembly will tend to penetrate into the area between the cell wall and the electrode traversing the cell wall, as explained earlier. If the bath reaches the seals around the electrode adjacent the conductive shell of the cell, the bath collects and tends to create a path for current flow between electrode and the conductive shell, thereby reducing the effectiveness of the electrode in the operation of the cell.

With the cooling of the lead 16 in the area of the insulating sleeve 23, any solidifiable bath material penetrating into the space 24 between the electrode sleeve 20 and the insulating sleeve 23 will be frozen before it reaches the locality of the cell shell 13 and the seals 32, the solidified material minimizing further penetration of the bath, and the sleeve 23 thereby maintaining the insulation of the electrode sleeve and lead from the conductive shell 13.

From the foregoing description it should now be apparent that a new and useful electrode structure and assembly has been disclosed in which an impervious, electrically conductive sleeve is employed to protect a metal lead in a highly corrosive environment, the metal providing the low voltage drop obtainable with metal connections, and the electrical conductivity of the sleeve insuring good electrical contact between the lead and the electrode.

As explained earlier, the electrode assembly of the invention is significant in the process of electrolytically reducing aluminum from aluminum chloride, and though the invention does not in itself make such a reduction commercially viable reality, it does provide a solution to a long standing problem that has heretofore impeded progress in this area, and thus contributes to making the reduction process a commercial reality. The invention, however, has appreciable utility in cells and structures other than those employed in reducing aluminum from aluminum chloride, or for example, in the electrical connection of graphite resistance heaters located within a furnace chamber in the production of aluminum chloride from chlorine gas, alumina bearing material and carbon.

While the invention has been described in terms of preferred embodiments, the claims appended hereto are intended to encompass all embodiments which fall within the spirit and scope of the invention.

Having thus described my invention and certain embodiments thereof, I claim:

1. An electrode assembly for use in the production of aluminum in an electrolytic cell having a corrosive environment including chlorine gas and an aluminum chloride dissolved in a molten solvent of higher decomposition potential than aluminum chloride, the electrode assembly comprising an electrode disposed within said cell and exposed to said environment, an electrically conductive lead extending into said electrode, and traversing a defining wall of said cell, the material of said lead being susceptible to corrosive attack by said environment, and a fluid impervious, electrically conductive sleeve disposed around said lead along at least the portion thereof traversing said cell wall, and in contact with the electrode.

2. The structure of claim 1 in which the impervious sleeve extends into the electrode with the lead, and completely encloses the lead within the electrode and within the cell.

3. The structure of claim 1 in which the material of the impervious sleeve is graphite coated with a pyrolytic graphite material.

4. The structure of claim 1 in which the material of the conductive lead is metal.

5. The structure of claim 1 including an electrically insulating sleeve disposed around at least the portion of the impervious sleeve traversing the defining wall of the cell.

6. The structure of claim 1 including means for cooling the conductive lead along at least the portion traversing the cell wall.

7. The structure of claim 2 in which the outer diameter of the impervious sleeve of at least that portion extending into the electrode is provided with a taper along the length thereof, the decreasing dimension of the taper being in the direction of the electrode.

References Cited
UNITED STATES PATENTS

| | | | |
|---|---|---|---|
| 3,046,213 | 7/1962 | Bender | 204—286 X |
| 3,607,708 | 9/1971 | Priscu | 204—286 X |
| 3,612,751 | 10/1971 | Adaev et al. | 204—286 X |
| 3,645,878 | 2/1972 | Adaev et al. | 204—243 R |

JOHN H. MACK, Primary Examiner

D. R. VALENTINE, Assistant Examiner

U.S. Cl. X.R.

204—286